United States Patent [19]
Fukushima et al.

[11] Patent Number: 6,020,421
[45] Date of Patent: Feb. 1, 2000

[54] POLYESTER COMPOSITION AND METHOD FOR PRODUCING THE SAME

[75] Inventors: Yasumasa Fukushima; Kiwamu Yuki; Tsunetoshi Matsuda, all of Kyoto, Japan

[73] Assignee: Unitika Ltd., Hyogo, Japan

[21] Appl. No.: 09/144,460

[22] Filed: Sep. 1, 1998

[51] Int. Cl.⁷ .............................. C08K 5/49; C08G 63/78
[52] U.S. Cl. ..................... 524/710; 528/279; 528/283; 528/285; 528/286; 528/481; 528/487; 528/490; 528/503; 524/706; 524/713; 524/783
[58] Field of Search ................................ 528/279, 283, 528/285, 286, 481, 487, 490, 503; 524/706, 710, 713, 783

[56] References Cited

U.S. PATENT DOCUMENTS 4,401,804  8/1983  Wooten et al. .
5,241,046  8/1993  Shiraki et al. ........................ 528/502
5,444,144  8/1995  Tanaka et al. ........................ 528/503

FOREIGN PATENT DOCUMENTS

| 5-97990 | 4/1993 | Japan . |
| 6-184286 | 7/1994 | Japan . |
| 6-322082 | 11/1994 | Japan . |
| 2 172 601 | 9/1986 | United Kingdom . |
| WO 97 44376 | 11/1997 | WIPO . |

OTHER PUBLICATIONS

Patent abstracts of Japan, vol. 018, No. 502 (M–1676), Sep. 20, 1994.

*Primary Examiner*—Samuel A. Acquah
*Attorney, Agent, or Firm*—Sughrue, Mion, Zinn, Macpeak & Seas, PLLC

[57] ABSTRACT

A poly(ethylene terephthalate) polyester composition which is decreased in the amount of a cyclic trimer of ethylene terephthalate formed in melting, and a method for producing the same.

17 Claims, No Drawings

POLYESTER COMPOSITION AND METHOD FOR PRODUCING THE SAME

FIELD OF THE INVENTION

The present invention relates to a poly(ethylene terephthalate) polyester (hereinafter referred to as a "PET polyester") composition which is decreased in the amount of a cyclic trimer of ethylene terephthalate (hereinafter referred to as a "CTET") formed in melting, and a method for producing the same.

BACKGROUND OF THE INVENTION

The PET polyesters are excellent in mechanical strength, heat resistance, transparency and gas barrier properties, light in weight and inexpensive, so that they are widely used for bottles, sheets, films, fibers and foam articles. In particular, they are suitable as filling vessels for drinks and foodstuffs such as carbonated drinks, fruit juice drinks, liquid seasonings, cooking fat and oil, sake and wine.

Such PET polyesters are each produced by using a terephthalic acid component and an ethylene glycol component as main components, esterifying the terephthalic acid component with the ethylene glycol component, and then, conducting melt polycondensation usually in the presence of a polycondensation catalyst.

The PET polyester. thus produced contains a considerable amount of CTET, so that usually, the molecular weight is increased and the CTET is simultaneously reduced by solid-phase polymerization. However, it is known that, even if the CTET is reduced by solid-phase polymerization, the CTET is reproduced by melt extrusion in forming processing to cause an obstacle in a manufacturing process of a product of said polyester. For example, when hollow vessels such as bottles are produced, the CTET is reproduced in injection molding, which raises the problem that a die is contaminated with the CTET, or that the PET polyester is contaminated with the CTET as foreign matter to deteriorate qualities of the vessels. In the case of melt spinning, the CTET accumulates around an exit of a nozzle to cause bending of the extruded polymer at the exit, yarn breakage or yarn unevenness. Further, when films are produced, the CTET is reproduced in melting the polyester, which introduces the problem of film breakage or deterioration of qualities.

Accordingly, in order to solve the above-mentioned problems with regard to the CTET, it is necessary not only to decrease the CTET content by solid-phase polymerization, but also to inhibit formation of the CTET in melting to prevent an increase in the CTET content.

For solving these problems, various methods have hitherto been attempted. For example, JP-A-6-322082 (the term "JP-A" as used herein means an "unexamined published Japanese patent application") proposes a method of copolymerizing a monofunctional component having a hydroxyl group or a carboxyl group with a PET polyester. In this method, however, a terminal functional group is blocked with the monofunctional component in melt polycondensation, so that the polycondensation reaction is inhibited to cause failure to obtain a PET polyester having a high intrinsic viscosity.

Further, methods for producing PET polyesters through melt polycondensation and solid-phase polymerization processes, in which the polyesters are treated with hot water or water vapor after the solid-phase polymerization process to inactivate polycondensation catalysts contained in said polyesters, thereby inhibiting formation of the CTET in melt forming are proposed (U.S. Pat. Nos. 5,241,046 and 5,444,144, JP-A-5-97990 and JP-A-6-184286). However, these methods have the problem that hot water treating apparatuses or water vapor treating apparatuses are required in addition to polymerization apparatuses, for inactivating the polycondensation catalysts, resulting in high cost.

The present invention provide a PET polyester composition which is decreased in the amount of the CTET formed in melting, and a method for producing the same.

SUMMARY OF THE INVENTION

As a result of intensive studies for solving the above-mentioned problems, the present inventors have discovered that the object can be attained by mixing a specific phosphorus compound comprising a phosphorus atom having an oxidation number of V or a specific ether compound in a specific amount with a specific metal atom-containing PET polyester obtained by melt polycondensation and solid-phase polymerization, thus completing the present invention.

Thus, the gist of the invention is as follows:

(1) A PET polyester composition which comprises a metal atom A and a phosphorus compound comprising a phosphorus atom having an oxidation number of V, in which the amount of a CTET detected in melting at a temperature of 280° C. for 5 minutes is 0.5 part by weight or less per 100 parts by weight of said polyester, wherein the metal atom A is at least one metal atom selected from the group consisting of antimony, titanium and germanium atoms, and the phosphorus compound comprising a phosphorus atom having an oxidation number of V is at least one phosphoric acid, salt thereof or ester selected from the group consisting of orthophosphoric acid, metaphosphoric acid, polymetaphosphoric acids represented by $(HPO_3)_m$ (wherein m represents an integer of 3 or more) and polyphosphoric acids represented by $H_{n+2}P_nO_{3n+1}$ (wherein n represents an integer of 2 or more) and has a phosphoric acid-derived hydroxyl group;

(2) A method for producing the polyester composition described in the above (1) which comprises conducting melt polycondensation and solid-phase polymerization in the presence of $1\times10^{-6}$ to $1\times10^{-3}$ mol of a compound containing the metal atom A per mol of total acid component constituting said polyester to produce the polyester, and then, kneading therewith $1\times10^{-6}$ to $1\times10^{-2}$ mol of the phosphorus compound comprising a phosphorus atom having an oxidation number of V or a plastic resin containing $1\times10^{-6}$ to $1\times10^{-2}$ mol of the phosphorus compound comprising a phosphorus atom having an oxidation number of V, per mol of total acid component;

(3) A PET polyester composition which comprises a metal atom A and an ether linkage-containing compound, in which the amount of a CTET detected in melting at a temperature of 280° C. for 5 minutes is 0.5 part by weight or less per 100 parts by weight of said polyester, wherein the metal atom A is at least one metal atom selected from the group consisting of antimony, titanium and germanium atoms, and the ether linkage-containing compound is at least one ether compound selected from the group consisting of crown ethers, poly(alkylene glycols) and alkylene oxide adducts of bisphenols; and (4) A method for producing the polyester composition described in the above (3) which comprises conducting melt polycondensation and solid-phase polymerization in the presence of $1\times10^{-6}$ to $1\times10^{-3}$ mol of a compound containing the metal atom A per mol of total acid component constituting said polyester to produce the polyester, and then, kneading therewith $1\times10^{-3}$ to 10 parts by weight of the ether linkage-containing compound or a plastic resin containing $1\times10^{-3}$ to 10 parts by weight of the ether linkage-containing compound, per 100 parts by weight of said polyester.

DETAILED DESCRIPTION OF THE INVENTION

The polyester composition of the present invention is a composition in which a metal atom A, and a phosphorus compound comprising a phosphorus atom having an oxidation number of V or an ether linkage-containing compound are contained in a PET polyester, and the amount of a CTET detected in melting at a temperature of 280° C. for 5 minutes is required to be 0.5 part by weight or less, preferably within the range of 0.2 to 0.5 part by weight, and most preferably within the range of 0.3 to 0.5 part by weight, per 100 parts by weight of said polyester.

The PET polyester in the present invention is produced using a terephthalic acid component and an ethylene glycol component as main components, and contains ethylene terephthalate units in an amount of 80 mol % or more and preferably in an amount of 90 mol % or more.

In addition to the above-mentioned components, the PET polyester may contain a copolymerizable component such as an aromatic dicarboxylic acid component such as phthalic acid, isophthalic acid, 5-sulfoisophthalic acid (sodium salt), 2,6-naphthalenedicarboxylic acid, 4,4'-diphenyldicarboxylic acid or diphenylsulfodicarboxylic acid; an aromatic polycarboxylic acid component such as trimellitic acid, pyromellitic acid or an acid anhydride thereof; an aliphatic dicarboxylic acid component such as oxalic acid, succinic acid, adipic acid, sebacic acid, azelaic acid or decanedicarboxylic acid; an aliphatic diol component such as 1,2-propanediol, 1,3-propanediol, 1,2-butanediol, 1,3-butanediol, 1,4-butanediol, 2,3-butanediol, diethylene glycol, 1,5-pentanediol, neopentyl glycol, triethylene glycol or poly(ethylene glycol); an aliphatic polyhydric alcohol component such as trimethylolpropane or pentaerythritol; an alicyclic diol component such as 1,4-cyclohexanedimethanol or 1,4-cyclohexanediethanol; or a hydroxycarboxylic acid component such as 4-hydroxybenzoic acid or ε-caprolactone, in small amounts (usually less than 20 mol %, preferably less than 10 mol %) within the range not impairing the characteristics of the present invention.

The metal atoms A in the present invention include antimony, titanium and germanium atoms, and antimony and germanium atoms are particularly preferred.

The phosphorus compounds each containing a phosphorus atom having an oxidation number of V in the present invention include orthophosphoric acid, metaphosphoric acid, polymetaphosphoric acids represented by $(HPO_3)_m$ (wherein m represents an integer of 3 or more), polyphosphoric acids represented by $H_{n+2}P_nO_{3n+1}$ (wherein n represents an integer of 2 or more), and salts or esters thereof. These phosphorus compounds are required to have phosphoric acid-derived hydroxyl groups. The term "phosphoric acid-derived hydroxyl groups" as used herein means hydroxyl groups connecting to the phosphorus atom, and the number of the phosphoric acid-derived hydroxyl groups is preferably 1 to 3. Specific examples of the phosphorus compound include orthophosphoric acid, metaphosphoric acid, potassium metaphosphate, sodium metaphosphate, pyrophosphoric acid, potassium pyrophosphate, disodium dihydrogenpyrophosphate, tripolyphosphoric acid, potassium tripolyphosphate, sodium tripolyphosphate, trimetaphosphoric acid, sodium pqlyphosphate, aluminum phosphate (monobasic), magnesium monohydrogenphosphate, monoethyl phosphate and monooctyl phosphate.

Of the ether linkage-containing compounds in the present invention, the crown ethers can be represented by the following general formula (1). Specific examples thereof include 1,4,7,10-tetraoxycyclododecane, 1,4,7,10,13-pentaoxycyclopentadecane and 1,4,7,10,13,16-hexaoxycyclooctadecane.

(1)

wherein m is an integer of 1 to 4, and n is an integer of 4 to 10.

Further, of the ether linkage-containing compounds, the poly(alkylene glycols) can be represented by the following general formula (2). Specific examples thereof include poly(ethylene glycol), poly(propylene glycol), poly(tetramethylene glycol), poly(ethylene glycol)/poly(propylene glycol) block copolymers and poly(ethylene glycol)/poly(propylene glycol)/poly(ethylene glycol) block copolymers.

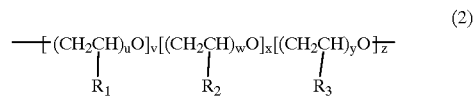

(2)

wherein u, w and y each represents an integer of 1 to 3, at =least one of v, x and z is an integer of 1 or more (preferably 1 to 500), $R_1$, $R_2$ and $R_3$ each represents a hydrogen atom or a methyl group, and the terminal groups of the poly(alkylene glycols) may be any molecular groups (e.g., a hydrogen atom, a methyl group, an ethyl group, a propyl group, a butyl group, a phenyl group, an acrylic group, a methacrylic group).

Furthermore, of the ether linkage-containing compounds, the alkylene oxide adducts of bisphenols can be represented by the following general formula (3). Specific examples thereof include an ethylene oxide adduct of bisphenol A, a propylene oxide adduct of bisphenol A, a butylene oxide adduct of bisphenol A, an ethylene oxide adduct of bisphenol S, a propylene oxide adduct of bisphenol S and a butylene oxide adduct of bisphenol S.

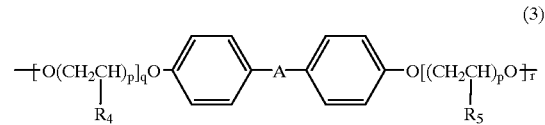

(3)

wherein p is an integer of 1 to 4, at least one of q and r is an integer of 1 or more (preferably 1 to 500), A represents —$C(CH_3)_2$—, —$CH_2$—, —$SO_2$—, —CO— or —S—, $R_4$ and $R_5$ each represents a hydrogen atom or a methyl group, and the terminal groups of the alkylene oxide adduct of the bisphenol may be any molecular groups (e.g., a hydrogen atom, a methyl group, an ethyl group, a propyl group, a butyl group, a phenyl group, an acrylic group, a methacrylic group).

Then, the method for producing the polyester composition of the present invention is described.

In the method of the present invention, it is necessary to produce the PET polyester containing the metal atom A, as the first step. For this purpose, an esterification reaction is first accomplished using the terephthalic acid component and the ethylene glycol component as main components to obtain an esterified product. Usually, the esterified product can be obtained by adding terephthalic acid and ethylene glycol-to bis(β-hydroxyethyl) terephthalate (hereinafter briefly referred to as "BHET") and/or a low polymerization-degree polymer thereof obtained by the esterification reaction of terephthalic acid with ethylene glycol, and conducting esterification at a temperature of 160° C. to 280° C. under an atmosphere of nitrogen gas.

Then, melt polycondensation of the resulting esterified product is accomplished in the presence of a compound containing a specific amount of the metal atom A, usually under a reduced pressure of about 0.01 to about 13.3 hPa at a temperature of 260° C. to 310° C., preferably 275° C. to 290° C., to obtain a prepolymer of the PET polyester (hereinafter referred to as a "PET prepolymer").

In this case, the metal atom A is used as a polycondensation catalyst. The metal atoms A include antimony, titanium and germanium atoms. Further, the metal atoms A-containing compounds include oxides, hydroxides, halides, carboxylates, carbonates and alkylated products thereof, and specific examples thereof are antimony trioxide, antimony acetate, germanium dioxide, tetra-n-butyl titanate, tetraisobutyl titanate, tetraethyl titanate, tri-n-butyl titanate and triisobutyl titanate.

The compounding amount of the metal atom A-containing compound is required to be within the range of $1 \times 10^{-6}$ to $1 \times 10^{-2}$ mol, preferably within the range of $1 \times 10^{-5}$ to $1 \times 10^{-3}$ mol, and most preferably within the range of $5 \times 10^{-5}$ to $5 \times 10^{-3}$ mol, per mol of total acid component constituting the PET polyester. When the compounding amount is less than $1 \times 10^{-6}$ mol, the PET polyester having a high intrinsic viscosity. On the other hand, when the compounding amount exceeds $1 \times 10^{-2}$ mol, unfavorably, the hue and transparency of the polyester is deteriorated and die contamination is liable to occur in forming.

Further, it is preferred that phosphorus compounds having no phosphoric acid-derived hydroxyl groups such as phosphates and phosphites are added as heat stabilizers in melt polycondensation. The phosphates such as triethyl phosphate and tributyl phosphate are particularly preferred among others. The content of the phosphorus compound is preferably within the range of $1 \times 10^{-7}$ to $1 \times 10^{-3}$ mol, and particularly preferably within the range of $1 \times 10^{-5}$ to $1 \times 10^{-4}$ mol, per mol of total acid component constituting the PET polyester.

In melt polycondensation, the metal atom A-containing compounds and the phosphorus compounds as the heat stabilizers are preferably added immediately before the melt polycondensation in terms of productivity and easy handling.

In the PET prepolymers produced in the above-mentioned melt polycondensation, the CTET content usually exceeds 0.5 part by weight per 100 parts by weight of said prepolymer, and die contamination is extremely liable to occur in forming. In the present invention, therefore, the subsequent solid-phase polymerization is required.

The solid-phase polymerization is preferably carried out by pelletizing the PET prepolymer obtained by the melt polycondensation into chips having a diameter of 2 to 5 mm and a length of 3 to 6 mm, preferably a diameter of 3 to 4 mm and a length of 4 to 5 mm, and then, heating the chips in a stream of an inert gas or under reduced pressure at a temperature lower than the melting point of said prepolymer for 5 hours or more, preferably for 10 hours or more. In this case, the temperature of the solid-phase polymerization is more preferably at least 10° C. lower than the melting point, and 190° C. or more. When this temperature is less than 190° C., the decreasing speed of the CTET content is slow to require a long period of time for the solid-phase polymerization. On the other hand, when this temperature is near the melting point, the chips are of course unfavorably fused.

Preliminary crystallization performed at a temperature lower than the solid-phase polymerization temperature prior to the solid-phase polymerization allows the solid-phase polymerization to efficiently proceed. This preliminary crystallization process is usually performed by heating the chips of the PET prepolymer in a dried state at a temperature of 100° C. to 180° C. for 30 minutes to 8 hours.

The PET polyester obtained by the above-mentioned melt polycondensation and-solid-phase polymerization usually has a CTET content of 0.5 part by weight or less per 100 parts by weight of said polyester, and an intrinsic viscosity of 0.5 to 1.0, usually 0.6 to 0.8. However, melt forming processing at a temperature of near 280° C. results in a CTET content of more than 0.5 part by weight.

Then, in the present invention, it is necessary to knead a specific amount of the phosphorus compound comprising a phosphorus atom having an oxidation number of V, a specific amount of the ether linkage-containing compound, or the thermoplastic resin containing the phosphorus compound comprising a phosphorus atom having an oxidation number of V or the ether linkage-containing compound, with the PET polyester obtained by the above-mentioned method, as the second step. As a kneading method, any of melt kneading and dry blending may be used. However, melt kneading is better for exhibiting the characteristics of the present invention.

In this case, the compounding amount of the phosphorus compound comprising a phosphorus atom having an oxidation number of V is required to be within the range of $1 \times 10^{-6}$ to $1 \times 10^{-2}$ mol, preferably within the range of $1 \times 10^{-6}$ to $1 \times 10^{-3}$ mol, and most preferably within the range of $1 \times 10^{-6}$ to $1 \times 10^{-4}$ mol, per mol of total acid component constituting the PET polyester. A compounding amount of less than $1 \times 10^{-6}$ mol decreases the effect of inhibiting the formation of the CTET in melting, whereas a compounding amount exceeding $1 \times 10^{-2}$ mol causes the problem of a decrease in viscosity of the polyester or coloring.

Further, the compounding amount of the ether linkage-containing compound is required to be within the range of $1 \times 10^{-3}$ to 10 parts by weight, preferably within the range of $1 \times 10^{-2}$ to 5 parts by weight, and most preferably within the range of $1 \times 10^{-1}$ to 2 parts by weight, per 100 parts by weight of the PET polyester. A compounding amount of less than $1 \times 10^{-3}$ part by weight decreases the effect of inhibiting the formation of the CTET in remelting, whereas a compounding amount exceeding 10 parts by weight causes the problem of a decrease in viscosity of the polyester or coloring.

The thermoplastic resin containing the phosphorus compound comprising a phosphorus atom having an oxidation number of V or the ether linkage-containing compound can be used in any of pellet-like, powdery and fibrous forms. In this case, the thermoplastic resins include polybutadiene, butadiene/styrene copolymers, acrylic rubber, ethylene/propylene copolymers, ethylene/propylene/butadiene copolymers, natural rubber, chlorinated butyl rubber, chlorinated polyethylene, styrene/maleic anhydride copolymers, styrene/phenylmaleimide copolymers, polyethylene, polypropylene, butadiene/acrylonitrile copolymers, poly(vinyl chloride), poly(butylene terephthalate), polyacetals, poly(vinylidene fluoride), polysulfones, poly(phenylene sulfide), polyethersulfones, phenoxy resins, poly(phenylene ethers), poly(methyl methacrylate), polyetherketones, polycarbonates, polytetrafluoroethylene, polyarylates and thermoplastic polyimides, as well as the above-mentioned PET polyesters. The PET polyesters are particularly preferred.

The reason why the CTET formation is inhibited in melting in the polyester composition of the present invention is presumed to be that the phosphorus compound comprising a phosphorus atom having an oxidation number of V or the ether linkage-containing compound coordinates (interacts) with the polycondensation catalyst contained in the PET polyester to stabilize the polyester, thereby inhibiting the above-mentioned CTET formation in melting at high temperature.

Accordingly, when bottles, films, fibers and foam articles are formed using the polyester compositions of the present invention by methods known in the art, die contamination is decreased, and formed articles stable in qualities can be obtained.

The present invention will be described with reference to the following examples in detail.

Materials and measuring methods used in Examples and Comparative Examples are as follows:

1. Materials

Aluminum phosphate (monobasic): manufactured by Ishizu Seiyaku Ltd.

Magnesium monohydrogenphosphate: manufactured by Ishizu Seiyaku Ltd.

Monoethyl phosphate: manufactured by Johoku Kagaku Kogyo Co.

Monooctyl phosphate: manufactured by Johoku Kagaku Kogyo Co.

Potassium pyrophosphate: manufactured by Nacalai Tesque Co.

Potassium metaphosphate: manufactured by Nacalai Tesque Co.

Potassium tripolyphosphate: manufactured by Nacalai Tesque Co.

Sodium polyphosphate: manufactured by Wako Pure Chemical Industries Ltd.

Poly(ethylene glycol) (average molecular weight: 4,600): manufactured by Aldrich Co.

Poly(ethylene glycol) (average molecular weight: 10,000): manufactured by Aldrich Co.

Poly(propylene glycol) (average molecular weight: 4,000): manufactured by Aldrich Co.

Poly(tetramethylene glycol) (average molecular weight: 1,000): manufactured by Polyscience Co.

1,4,7,10,13,16-Hexaoxycyclooctadecane: manufactured by Aldrich Co.

Ethylene oxide adduct of bisphenol A (average molecular weight: 1,500): manufactured by Aldrich Co.

2. Measuring Methods (a) Intrinsic Viscosity [η]

Using a mixture of phenol and 1,1,2,2-tetrachloroethane equal in weight as a solvent, the intrinsic viscosity was measured at a temperature of 20° C. and indicated in dl/g.

(b) Amount of CTET Detected

Chips (200 mg) of a polyester composition were melted at a temperature of 280° C. for 5 minutes, and then, dissolved in 4 ml of a mixed solvent of hexafluoroisopropanol/chloroform (1/1 in volume ratio). Then, the resulting solution was poured into 196 ml of acetonitrile to precipitate the polymer. The amount of CTET contained in a filtrate filtered through a membrane filter was measured using a high performance liquid chromatograph (600E manufactured by Waters Co.) under the following conditions:

High Performance Liquid Chromatography Conditions:

Column: 5 µ C18–100 Å 3.9×150 mm

Eluent: A: acetonitrile/water=70/30 vol %

B: acetonitrile

Gradient: 0–6 minutes 100% A

6–20 minutes 0–100% B

Flow Rate: 1 ml/minute

Temperature: 25° C.

Detection: UV 254 nm

EXAMPLE 1

A slurry of terephthalic acid (TPA) and ethylene glycol (EG) in a molar ratio of 1/1.6 was continuously supplied to an esterification reaction vessel in which BHET and a low polymirization-degree polymer thereof were present, and allowed to react at a temperature of 250° C. under a pressure of 1050 hPa. The reaction time was 8 hours, and an esterified product having an average polymerization degree of 7 was continuously obtained.

Then, 60 kg of this esterified product was transferred to a polycondensation reaction vessel, $1.5\times10^{-4}$ mol of antimony trioxide and $3\times10^{-4}$ mol of triethyl phosphate were added thereto, based on mol of acid component. Thereafter, the inside of the polycondensation reaction vessel was gradually evacuated, and melt polycondensation was accomplished finally under a pressure of 0.67 hPa at a temperature of 280° C. for 2 hours. At the time when the melt polycondensation was completed, PET prepolymer chips having an intrinsic viscosity [η] of 0.60, a diameter of 3 mm and a length of 4 mm were obtained from the polycondensation reaction vessel.

Then, the chips were placed in a rotary solid-phase polymerization apparatus, and preliminarily dried under a reduced pressure of 1.33 hPa at 70° C. for 2 hours, followed by heating at 130° C. for 6 hours to crystallize the chips. Subsequently, the temperature was elevated to 230° C. while allowing nitrogen gas to flow, and solid-phase polymerization was conducted for 10 hours to obtain PET polyester chips having an intrinsic viscosity [η] of 0.75.

Thereafter, $6\times10^{-6}$ mol of aluminum phosphate (monobasic) was kneaded with the PET polyester chips obtained by the above-mentioned method, based on mnol of acid component of said polyester. Then, using an extruder in which the temperature of the inside of a cylinder was established to 280° C. and the residence (melting) time to 5 minutes, the resulting polyester composition was melt extruded, thereby obtaining polyester composition chips.

The amount of CTET detected was determined for the above-mentioned polyester composition chips. The amount of CTET detected was expressed in parts by weight per 100 parts by weight of PET polyester.

EXAMPLE 2

Polyester composition chips were obtained in the same manner as Example 1 with the exception that magnesium monohydrogenphosphate was used in place of aluminum phosphate (monobasic), and the amount of CTET detected was determined.

EXAMPLE 3

Polyester composition chips were obtained in the same manner as Example 1 with the exception that monoethyl phosphate was used in place of aluminum phosphate (monobasic), and the amount of CTET detected was determined.

EXAMPLE 4

Polyester composition chips were obtained in the same manner as Example 1 with the exception that monooctyl phosphate was used in place of aluminum phosphate (monobasic), and the amount of CTET detected was determined.

EXAMPLE 5

Polyester composition chips were obtained in the same manner as Example 1 with the exception that potassium pyrophosphate was used in place of aluminum phosphate (monobasic), and the amount of CTET detected was determined.

EXAMPLE 6

Polyester composition chips were obtained in the same manner as Example 1 with the exception that potassium metaphosphate was used in place of aluminum phosphate (monobasic), and the amount of CTET detected was determined.

EXAMPLE 7

Polyester composition chips were obtained in the same manner as Example 1 with the exception that potassium tripolyphosphate was used in place of aluminum phosphate (monobasic), and the amount of CTET detected was determined.

EXAMPLE 8

Polyester composition chips were obtained in the same manner as Example 1 with the exception that sodium polyphosphate was used in place of aluminum phosphate (monobasic), and the amount of CTET detected was determined.

EXAMPLE 9

One part by weight of poly(ethylene glycol) (average molecular weight: 4,600) was kneaded with the PET polyester chips after solid-phase polymerization obtained in Example 1, per 100 parts by weight of said polyester. Then, using an extruder in which the temperature of the inside of a cylinder was established to 280° C. and the residence (melting) time to 5 minutes, the resulting polyester composition was melt extruded, thereby obtaining polyester composition chips, and the amount of CTET detected was determined for the polyester composition chips.

EXAMPLE 10

Polyester composition chips were obtained in the same manner as Example 9 with the exception that poly(ethylene glycol) (average molecular weight: 10,000) was used in place of poly(ethylene glycol) (average molecular weight: 4,600), and the amount of CTET detected was determined.

EXAMPLE 11

Polyester composition chips were obtained in the same manner as Example 9 with the exception that poly(propylene glycol) (average molecular weight: 4,000) was used in place of poly(ethylene glycol) (average molecular weight: 4,600), and the amount of CTET detected was determined.

EXAMPLE 12

Polyester composition chips were obtained in the same manner as Example 9 with the exception that poly (tetramethylene glycol) (average molecular weight: 1,000) was used in place of poly(ethylene glycol) (average molecular weight: 4,600), and the amount of CTET detected was determined.

EXAMPLE 13

Polyester composition chips were obtained in the same manner as Example 9 with the exception that 1,4,7,10,13, 16-hexaoxycyclooctadecane was used in place of poly (ethylene glycol) (average molecular weight: 4,600), and the amount of CTET detected was determined.

EXAMPLE 14

Polyester composition chips were obtained in the same manner as Example 9 with the exception that an ethylene oxide adduct of bisphenol A (average molecular weight: 1,500) was used in place of poly(ethylene glycol) (average molecular weight: 4,600), and the amount of CTET detected was determined.

COMPARATIVE EXAMPLE 1

No material was added to the PET polyester chips after solid-phase polymerization obtained in Example 1, which was melt extruded using an extruder in which the temperature of the inside of a cylinder was established to 280° C. and the residence (melting) time to 5 minutes. For the resulting polyester chips, the amount of CTET detected was determined.

COMPARATIVE EXAMPLE 2

Polyester composition chips were obtained in the same manner as Example 1 with the exception that $5 \times 10^{-7}$ mol of aluminum phosphate (monobasic) was kneaded in place of $6 \times 10^{-6}$ mol of aluminum phosphate (monobasic), per mol of acid component of the PET polyester, and the amount of CTET detected was determined.

COMPARATIVE EXAMPLE 3

Polyester composition chips were obtained in the same manner as Example 9 with the exception that $5 \times 10^{-4}$ part by weight of poly(ethylene glycol) (average molecular weight: 4,600) was kneaded in place of 1 part by weight of poly (ethylene glycol) (average molecular weight: 4,600), per parts by weight of PET polyester, and the amount of CTET detected was determined.

COMPARATIVE EXAMPLE 4

Aluminum phosphate (monobasic) was kneaded with the PET prepolymer chips having an intrinsic viscosity [η] of 0.60 before solid-phase polymerization produced in Example 1 in an amount of $6 \times 10^{-6}$ mol per mol of acid component of said polyester prepolymer. Then, using an extruder in which the temperature of the inside of a cylinder was established to 280° C. and the residence (melting) time to 5 minutes, the resulting polyester composition was melt extruded, thereby obtaining polyester composition chips, and the amount of CTET detected was determined for the above-mentioned polyester composition chips.

COMPARATIVE EXAMPLE 5

Poly(ethylene glycol) (average molecular weight: 4,600) was kneaded with the PET prepolymer chips having an intrinsic viscosity [η] of 0.60 before solid-phase polymerization produced in Example 1 in an amount of 1 part by weight per 100 parts by weight of said polyester prepolymer. Then, using an extruder in which the temperature of the inside of a cylinder was established to 280° C. and the residence (melting) time to 5 minutes, the resulting polyester composition was melt extruded, thereby obtaining polyester composition chips, and the amount of CTET detected was determined for the polyester composition chips.

Results of Examples 1 to 14 and Comparative Examples 1 to 5 described above are shown in Table 1.

TABLE 1

|  | Kind of Phosphorus Compound or Ether Compound | Amount Added | Amount of CTET Detected (part by weight) |
|---|---|---|---|
| Example 1 | Aluminum phosphate (monobasic) | $6 \times 10^{-6}$ mol | 0.32 |
| Example 2 | Magnesium monohydrogenphosphate | $6 \times 10^{-6}$ mol | 0.47 |
| Example 3 | Monoethyl phosphate | $6 \times 10^{-6}$ mol | 0.36 |
| Example 4 | Monooctyl phosphate | $6 \times 10^{-6}$ mol | 0.39 |
| Example 5 | Potassium pyrophosphate | $6 \times 10^{-6}$ mol | 0.44 |
| Example 6 | Potassium metaphosphate | $6 \times 10^{-6}$ mol | 0.42 |
| Example 7 | Potassium tripolyphosphate | $6 \times 10^{-6}$ mol | 0.39 |
| Example 8 | Potassium polyphosphate | $6 \times 10^{-6}$ mol | 0.41 |
| Example 9 | Poly(ethylene glycol) (average molecular weight: 4,600) | 1 part by weight | 0.42 |
| Example 10 | Poly(ethylene glycol) (average molecular weight: 10,000) | 1 part by weight | 0.38 |
| Example 11 | Poly(propylene glycol) (average molecular weight: 4,000) | 1 part by weight | 0.36 |
| Example 12 | Poly(tetramethylene glycol) (average molecular weight: 1,000) | 1 part by weight | 0.39 |
| Example 13 | 1,4,7,10,13,16-Hexaoxycyclooctadecane | 1 part by weight | 0.44 |
| Example 14 | Ethylene oxide adduct of Bisphenol A | 1 part by weight | 0.41 |
| Comparative Example 1 | — | — | 0.62 |
| Comparative Example 2 | Aluminum phosphate (monobasic) | $5 \times 10^{-7}$ mol | 0.59 |
| Comparative Example 3 | Poly(ethylene glycol) (average molecular weight: 4,600) | $5 \times 10^{-4}$ part by weight | 0.53 |
| Comparative Example 4 | Aluminum phosphate (monobasic) | $6 \times 10^{-6}$ mol | 0.83 |
| Comparative Example 5 | Poly(ethylene glycol) (average molecular weight: 4,600) | 1 part by weight | 0.74 |

EXAMPLE 15

PET polyester chips having an intrinsic viscosity [η] of 0.77 was obtained in the same manner as Example 1 with the exception that $2.4 \times 10^{-4}$ mol of germanium dioxide was used in place of $1.5 \times 10^{-4}$ mol of antimony trioxide.

Then, aluminum phosphate (monobasic) was kneaded with the PET polymer chips obtained by the above-mentioned method in an amount of $6 \times 10^{-6}$ mol per mol of acid component of said polyester. Thereafter, using an extruder in which the id temperature of the inside of a cylinder was established to 280° C. and the residence (melting) time to 5 minutes, the resulting polyester composition was melt extruded, thereby obtaining polyester composition chips.

The amount of CTET detected was determined for the above-mentioned polyester composition chips.

EXAMPLE 16

Polyester composition chips were obtained in the same manner as Example 15 with the exception that magnesium monohydrogenphosphate was used in place of aluminum phosphate (monobasic), and the amount of CTET detected was determined.

EXAMPLE 17

Polyester composition chips were obtained in the same manner as Example 15 with the exception that monoethyl phosphate was used in place of aluminum phosphate (monobasic), and the amount of CTET detected was determined.

EXAMPLE 18

Polyester composition chips were obtained in the same manner as Example 15 with the exception that monooctyl phosphate was used in place of aluminum phosphate (monobasic), and the amount of CTET detected was determined.

EXAMPLE 19

Polyester composition chips were obtained in the same manner as Example 15 with the exception that potassium pyrophosphate was used in place.of aluminum phosphate (monobasic), and the amount of CTET detected was determined.

EXAMPLE 20

Polyester composition chips were obtained in the same manner as Example 15 with the exception that potassium metaphosphate was used in place of aluminum phosphate (monobasic), and the amount of CTET detected was determined.

EXAMPLE 21

Polyester composition chips were obtained in the same manner as Example 15 with the exception that potassium tripolyphosphate was used in place of aluminum phosphate (monobasic), and the amount of CTET detected was determined.

EXAMPLE 22

Polyester composition chips were obtained in the same manner as Example 15 with the exception that sodium polyphosphate was used in place of aluminum phosphate (monobasic), and the amount of CTET detected was determined.

EXAMPLE 23

Poly(ethylene glycol) (average molecular weight: 4,600) was kneaded with the PET polyester chips after solid-phase polymerization obtained in Example 15 in an amount of 1 part by weight per 100 parts by weight of said polyester. Then, using an extruder in which the temperature of the inside of a cylinder was established to 280° C. and the residence (melting) time to 5 minutes, the resulting polyester composition was melt extruded, thereby obtaining polyester composition chips, and the amount of CTET detected was determined for the polyester composition chips.

EXAMPLE 24

Polyester composition chips were obtained in the same manner as Example 23 with the exception that poly(ethylene glycol) (average molecular weight: 10,000) was used in place of poly(ethylene glycol) (average molecular weight: 4,600), and the amount of CTET detected was determined.

EXAMPLE 25

Polyester composition chips were obtained in the same manner as Example 23 with the exception that poly (propylene glycol) (average molecular weight: 4,000) was used in place of poly(ethylene glycol) (average molecular weight: 4,600), and the amount of CTET detected was determined.

EXAMPLE 26

Polyester composition chips were obtained in the same manner as Example 23 with the exception that poly (tetramethylene glycol) (average molecular weight: 1,000) was used in place of poly(ethylene glycol) (average molecular weight: 4,600), and the amount of CTET detected was determined.

EXAMPLE 27

Polyester composition chips were obtained in the same manner as Example 23 with the exception that 1,4,7,10,13,16-hexaoxycyclooctadecane was used in place of poly (ethylene glycol) (average molecular weight: 4,600), and the amount of CTET detected was determined.

EXAMPLE 28

Polyester composition chips were obtained in the same manner as Example 23 with the exception that an ethylene oxide adduct of bisphenol A (average molecular weight: 1,500) was used in place of poly(ethylene glycol) (average molecular weight: 4,600), and the amount of CTET detected was determined.

COMPARATIVE EXAMPLE 6

No material was added to the PET polyester chips after solid-phase polymerization obtained in Example 15, which was melt extruded using an extruder in which the temperature of the inside of a cylinder was established to 280° C. and the residence (melting) time to 5 minutes. For the resulting polyester chips, the amount of CTET detected was determined.

COMPARATIVE EXAMPLE 7

Polyester composition chips were obtained in the same manner as Example 15 with the exception that $5 \times 10^{-7}$ mol of aluminum phosphate (monobasic) was kneaded in place of $6 \times 10^{-6}$ mol of aluminum phosphate (monobasic), per mol of acid component of the PET polyester, and the amount of CTET detected was determined.

COMPARATIVE EXAMPLE 8

Polyester composition chips were obtained in the same manner as Example 23 with the exception that $5 \times 10^{-4}$ part by weight of poly(ethylene glycol) (average molecular weight: 4,600) was kneaded in place of 1 part by weight of poly(ethylene glycol) (average molecular weight: 4,600), per 100 parts by weight of PET polyester, and the amount of CTET detected was determined.

COMPARATIVE EXAMPLE 9

Aluminum phosphate (monobasic) was kneaded with the PET prepolymer chips having an intrinsic viscosity $[\eta]$ of 0.62 before solid-phase polymerization produced in Example 15 in an amount of $6 \times 10^{-6}$ mol per mol of acid component of said polyester prepolymer. Then, using an extruder in which the temperature of the inside of a cylinder was established to 280° C. and the residence (melting) time to 5 minutes, the resulting polyester composition was melt extruded, thereby obtaining polyester composition chips.

The amount of CTET detected was determined for the above-mentioned polyester composition chips.

COMPARATIVE EXAMPLE 10

Poly(ethylene glycol) (average molecular weight: 4,600) was kneaded with the PET prepolymer chips having an intrinsic viscosity ($[\eta]$) of 0.62 before solid-phase polymerization produced in Example 15 in an amount of 1 part by weight per 100 parts by weight of said polyester prepolymer. Then, using an extruder in which the internal temperature was established to 280° C. and the residence (melting) time to 5 minutes, the resulting polyester composition was melt extruded, thereby obtaining polyester composition chips, and the amount of CTET detected was determined for the polyester composition chips.

Results of Examples 15 to 28 and Comparative Examples 6 to 10 described above are shown in Table 2.

TABLE 2

| | Kind of Phosphorus Compound or Ether Compound | Amount Added | Amount of CTET Detected (part by weight) |
| --- | --- | --- | --- |
| Example 15 | Aluminum phosphate (monobasic) | $6 \times 10^{-6}$ mol | 0.42 |
| Example 16 | Magnesium monohydrogenphosphate | $6 \times 10^{-6}$ mol | 0.41 |
| Example 17 | Monoethyl phosphate | $6 \times 10^{-6}$ mol | 0.43 |
| Example 18 | Monooctyl phosphate | $6 \times 10^{-6}$ mol | 0.45 |
| Example 19 | Potassium pyrophosphate | $6 \times 10^{-6}$ mol | 0.48 |
| Example 20 | Potassium metaphosphate | $6 \times 10^{-6}$ mol | 0.41 |
| Example 21 | Potassium tripolyphosphate | $6 \times 10^{-6}$ mol | 0.46 |
| Example 22 | Potassium polyphosphate | $6 \times 10^{-6}$ mol | 0.43 |
| Example 23 | Poly(ethylene glycol) (average molecular weight: 4,600) | 1 part by weight | 0.43 |
| Example 24 | Poly(ethylene glycol) (average molecular weight: 10,000) | 1 part by weight | 0.35 |
| Example 25 | Poly(propylene glycol) (average molecular weight: 4,000) | 1 part by 4 weight | 0.35 |
| Example 26 | Poly(tetramethylene glycol) (average molecular weight: 1,000) | 1 part by weight | 0.38 |
| Example 27 | 1,4,7,10,13,16-Hexaoxycyclooctadecane | 1 part by weight | 0.41 |
| Example 28 | Ethylene oxide adduct of Bisphenol A | 1 part by weight | 0.39 |
| Comparative Example 6 | — | — | 0.59 |
| Comparative Example 7 | Aluminum phosphate (monobasic) | $5 \times 10^{-7}$ mol | 0.61 |
| Comparative Example 8 | Poly(ethylene glycol) (average molecular weight: 4,600) | $5 \times 10^{-4}$ part by weight | 0.54 |
| Comparative Example 9 | Aluminum phosphate (monobasic) | $6 \times 10^{-6}$ mol | 0.79 |
| Comparative Example 10 | Poly(ethylene glycol) (average molecular weight: 4,600) | 1 part by weight | 0.71 |

EXAMPLE 29

To an esterification reaction vessel in which 100 parts by weight of BHET was present, 3965 parts by weight of TPA, 353 parts by weight of isophthalic acid and 1940 parts by weight of EG were supplied, and allowed to react at a temperature of 250° C. under a pressure of 50 hPaG. The reaction time was 8 hours, thereby obtaining an esterified product.

Then, 60 kg of this esterified product was transferred to a polycondensation reaction vessel, $1.5 \times 10^{-4}$ mol of antimony trioxide and $3 \times 10^{-4}$ mol of triethyl phosphate were added thereto, based on mol of acid component.

Thereafter, the inside of the polycondensation reaction vessel was gradually evacuated, and melt polycondensation was accomplished finally under a pressure of 0.67 hPa at a temperature of 280° C. for 2 hours. At the time when the melt polycondensation was completed, PET prepolymer chips having an intrinsic viscosity [η] of 0.60, a diameter of 3 mm and a length of 4 mm were obtained from the polycondensation reaction vessel.

Then, the chips were placed in a rotary solid-phase polymerization apparatus, and preliminarily dried under a reduced pressure of 1.33 hPa at 70° C. for 2 hours, followed by heating at 130° C. for 6 hours to crystallize the chips. Subsequently, the temperature was elevated to 230° C. while allowing nitrogen gas to flow, and solid-phase polymerization was conducted for 10 hours to obtain isophthalic acid-containing PET polyester chips having an intrinsic viscosity [η] of 0.74. The isophthalic acid content of this PET polyester was calculated from 300-MHz proton NMR (apparatus: JEOL Lambda 300 WB, measuring solvent: $CF_3COOD$) and 8% by weight.

Then, $6 \times 10^{-6}$ mol of aluminum phosphate (monobasic) was kneaded with the PET polyester chips obtained by the above-mentioned method, based on-mol of acid component of said polyester. Thereafter, using an extruder in which the temperature of the inside of a cylinder was established to 280° C. and the residence (melting) time to 5 minutes, the resulting polyester composition was melt extruded, thereby obtaining polyester composition chips.

The amount of CTET detected was determined for the above-mentioned polyester composition chips.

EXAMPLE 30

Polyester composition chips were obtained in the same manner as Example 29 with the exception that magnesium monohydrogenphosphate was used in place of aluminum phosphate (monobasic), and the amount of CTET detected was determined.

EXAMPLE 31

Polyester composition chips were obtained in the same manner as Example 29 with the exception that monoethyl phosphate was used in place of aluminum phosphate (monobasic), and the amount of CTET detected was determined.

EXAMPLE 32

Polyester composition chips were obtained in the same manner as Example 29 with the exception that monooctyl phosphate was used in place of aluminum phosphate (monobasic), and the amount of CTET detected was determined.

EXAMPLE 33

Polyester composition chips were obtained in the same manner as Example 29 with the exception that potassium pyrophosphate was used in place of aluminum phosphate (monobasic), and the amount of CTET detected was determined.

EXAMPLE 34

Polyester composition chips were obtained in the same manner as Example 29 with the exception that potassium metaphosphate was used in place of aluminum phosphate (monobasic), and the amount of CTET detected was determined.

EXAMPLE 35

Polyester composition chips were obtained in the same manner as Example 29 with the exception that potassium tripolyphosphate was used in place of aluminum phosphate (monobasic), and the amount of CTET detected was determined.

EXAMPLE 36

Polyester composition chips were obtained in the same manner as Example 29 with the exception that sodium polyphosphate was used in place of aluminum phosphate (monobasic), and the amount of CTET detected was determined.

EXAMPLE 37

Poly(ethylene glycol) (average molecular weight: 4,600) was kneaded with the PET polyester chips after solid-phase polymerization obtained in Example 29 in an amount of 1 part by weight per 100 parts by weight of said polyester. Then, using an extruder in which the temperature of the inside of a cylinder was established to 280° C. and the residence (melting) time to 5 minutes, the resulting polyester composition was melt extruded, thereby obtaining polyester composition chips, and the amount of CTET detected was determined for the polyester composition chips.

EXAMPLE 38

Polyester composition chips were obtained in the same manner as Example 37 with the exception that poly(ethylene glycol) (average molecular weight: 10,000) was used in place of poly(ethylene glycol) (average molecular weight: 4,600), and the amount of CTET detected was determined.

EXAMPLE 39

Polyester composition chips were obtained in the same manner as Example 37 with the exception that poly (propylene glycol) (average molecular weight: 4,000) was used in place of poly(ethylene glycol) (average molecular weight: 4,600), and the amount of CTET detected was determined.

EXAMPLE 40

Polyester composition chips were obtained in the same manner as Example 37 with the exception that poly (tetramethylene glycol) (average molecular weight: 1,000) was used in place of poly(ethylene glycol) (average molecular weight: 4,600), and the amount of CTET detected was determined.

EXAMPLE 41

Polyester composition chips were obtained in the same manner as Example 37 with the exception that 1,4,7,10,13, 16-hexaoxycyclooctadecane was used in place of poly (ethylene glycol) (average molecular weight: 4,600), and the amount of CTET detected was determined.

EXAMPLE 42

Polyester composition chips were obtained in the same manner as Example 37 with the exception that an ethylene oxide adduct of bisphenol A (average molecular weight: 1,500) was used in place of poly(ethylene glycol) (average molecular weight: 4,600), and the amount of CTET detected was determined.

COMPARATIVE EXAMPLE 11

No material was added to the PET polyester chips after solid-phase polymerization obtained in Example 29, which was melt extruded using an extruder in which the temperature of the inside of a cylinder was established to 280° C. and the residence (melting) time to 5 minutes. For the resulting polyester chips, the amount of CTET detected was determined.

COMPARATIVE EXAMPLE 12

Polyester composition chips were obtained in the same manner as Example 29 with the exception that $5 \times 10^{-7}$ mol of aluminum phosphate (monobasic) was kneaded in place of $6 \times 10^{-6}$ mol of aluminum phosphate (monobasic), per mol of acid component of the PET polyester, and the amount of CTET detected was determined.

COMPARATIVE EXAMPLE 13

Polyester composition chips were obtained in the same manner as Example 37 with the exception that $5 \times 10^{-4}$ part by weight of poly(ethylene glycol) (average molecular weight: 4,600) was kneaded in place of 1 part by weight of poly(ethylene glycol) (average molecular weight: 4,600), per 100 parts by weight of PET polyester, and the amount of CTET detected was determined.

COMPARATIVE EXAMPLE 14

Aluminum phosphate (monobasic) was kneaded with the PET prepolymer chips having an intrinsic viscosity [η] of 0.60 before solid-phase polymerization produced in Example 29 in an amount of $6 \times 10^{-6}$ mol per mol of acid component of said polyester prepolymer. Then, using an extruder in which the temperature of the inside of a cylinder was established to 280° C. and the residence (melting) time to 5 minutes, the resulting polyester composition was melt extruded, thereby obtaining polyester composition chips.

The amount of CTET detected was determined for the above-mentioned polyester composition chips.

COMPARATIVE EXAMPLE 15

Poly(ethylene glycol) (average molecular weight: 4,600) was kneaded with the PET prepolymer chips having an intrinsic viscosity [η] of 0.60 before solid-phase polymerization produced in Example 29 in an amount of 1 part by weight per 100 parts by weight of said polyester prepolymer. Then, using an extruder in which the internal temperature was established to 280° C. and the residence (melting) time to 5 minutes, the resulting polyester composition was melt extruded, thereby obtaining polyester composition chips, and the amount of CTET detected was determined for the polyester composition chips.

Results of Examples 29 to 42 and Comparative Examples 11 to 15 described above are shown in Table 3.

TABLE 3

| | Kind of Phosphorus Compound or Ether Compound | Amount Added | Amount of CTET Detected (part by weight) |
|---|---|---|---|
| Example 29 | Aluminum phosphate (monobasic) | $6 \times 10^{-6}$ mol | 0.35 |
| Example 30 | Magnesium monohydrogen-phosphate | $6 \times 10^{-6}$ mol | 0.39 |
| Example 31 | Monoethyl phosphate | $6 \times 10^{-6}$ mol | 0.44 |
| Example 32 | Monooctyl phosphate | $6 \times 10^{-6}$ mol | 0.42 |
| Example 33 | Potassium pyrophosphate | $6 \times 10^{-6}$ mol | 0.45 |
| Example 34 | Potassium metaphosphate | $6 \times 10^{-6}$ mol | 0.39 |
| Example 35 | Potassium tripolyphosphate | $6 \times 10^{-6}$ mol | 0.47 |
| Example 36 | Potassium polyphosphate | $6 \times 10^{-6}$ mol | 0.44 |
| Example 37 | Poly(ethylene glycol) (average molecular weight: 4,600) | 1 part by weight | 0.35 |
| Example 38 | Poly(ethylene glycol) (average molecular weight: 10,000) | 1 part by weight | 0.33 |
| Example 39 | Poly(propylene glycol) (average molecular weight: 4,000) | 1 part by weight | 0.37 |
| Example 40 | Poly(tetramethylene glycol) (average molecular weight: 1,000) | 1 part by weight | 0.39 |
| Example 41 | 1,4,7,10,13,16-Hexaoxy-cyclooctadecane | 1 part by weight | 0.42 |
| Example 42 | Ethylene oxide adduct of Bisphenol A | 1 part by weight | 0.37 |
| Comparative Example 11 | — | — | 0.57 |
| Comparative Example 12 | Aluminum phosphate (monobasic) | $5 \times 10^{-7}$ mol | 0.55 |
| Comparative Example 13 | Poly(ethylene glycol) (average molecular weight: 4,600) | $5 \times 10^{-4}$ part by weight | 0.54 |
| Comparative Example 14 | Aluminum phosphate (monobasic) | $6 \times 10^{-6}$ mol | 0.76 |
| Comparative Example 15 | Poly(ethylene glycol) (average molecular weight: 4,600) | 1 part by weight | 0.68 |

While the invention has been described in detail and with reference to specific embodiments thereof, it will be apparent to one skilled in the art that various changes and modifications can be made therein without departing from the spirit and scope thereof.

What is claimed is:

1. A poly(ethylene terephthalate) polyester composition which comprises a metal atom A and a phosphorus compound comprising a phosphorus atom having an oxidation number of V, in which the amount of a cyclic trimer of ethylene terephthalate detected in melting at a temperature of 280° C. for 5 minutes is 0.5 part by weight or less per 100 parts by weight of said polyester, wherein the metal atom A is at least one metal atom selected from the group consisting of antimony, titanium and germanium atoms, and the phosphorus compound comprising a phosphorus atom having an oxidation number of V is at least one salt of phosphoric acid selected from the group consisting of orthophosphoric acid salts, metaphosphoric acid salts, salts of polymetaphosphoric acids represented by $(HPO_3)_m$ (wherein m represents an integer of 3 or more) and salts of polyphosphoric acids represented by $H_{n+2}P_nO_{3n+1}$ (wherein n represents an integer of 2 or more) and has a phosphoric acid-derived hydroxyl group.

2. The polyester composition according to claim 1, wherein the metal atom A is antimony.

3. The polyester composition according to claim 1, wherein the metal atom A is germanium.

4. A method for producing a poly(ethylene terephthalate) polyester composition which comprises a metal atom A and a phosphorus compound comprising a phosphorus atom having an oxidation number of V, in which the amount of a cyclic trimer of ethylene terephthalate detected in melting at a temperature of 280° C. for 5 minutes is 0.5 part by weight or less per 100 parts by weight of said polyester, wherein the metal atom A is at least one metal atom selected from the group consisting of antimony, titanium and germanium atoms, and the phosphorus compound comprising a phosphorus atom having an oxidation number of V is at least one phosphoric acid, salt thereof or ester selected from the group consisting of orthophosphoric acid, metaphosphoric acid, polymetaphosphoric acids represented by $(HPO_3)_m$ (wherein m represents an integer of 3 or more) and polyphosphoric acids represented by $H_{n+2}P_nO_{3n+1}$ (wherein n represents an integer of 2 or more) and has a phosphoric acid-derived hydroxyl group, which method comprises conducting melt polycondensation and solid-phase polymerization in the presence of $1 \times 10^{-6}$ to $1 \times 10^{-3}$ mol of a compound containing the metal atom A per mol of total acid component constituting said polyester to produce the polyester, and then, kneading therewith $1 \times 10^{-6}$ to $1 \times 10^{-2}$ mol of the phosphorous compound comprising a phosphorus atom having an oxidation number of V, per mol of total acid component.

5. The method according to claim 4, wherein the metal atom A is antimony.

6. The method according to claim 4, wherein the metal atom A is germanium.

7. A poly(ethylene terephthalate) polyester composition which comprises a metal atom A and an ether linkage-containing compound, in which the amount of a cyclic trimer of ethylene terephthalate detected in melting at a temperature of 280° C. for 5 minutes is 0.5 part by weight or less per 100 parts by weight of said polyester, wherein the metal atom A is at least one metal atom selected from the group consisting of antimony, titanium and germanium atoms, and the ether linkage-containing compound is at least one ether compound selected from the group consisting of crown ethers, poly(alkylene glycols) and alkylene oxide adducts of bisphenols.

8. The polyester composition according to claim 7, wherein the metal atom A is antimony.

9. The polyester composition according to claim 7, wherein the metal atom A is germanium.

10. A method for producing a poly(ethylene terephthalate) polyester composition which comprises a metal atom A and an ether linkage-containing compound in which the amount of a cyclic trimer of ethylene terephthalate detected in melting at a temperature of 280° for 5 minutes is 0.5 part by weight or less per 100 parts by weight of said polyester, wherein the metal atom A is at least one metal atom selected from the group consisting of antimony, titanium and germanium atoms, and the ether linkage-containing compound is at least one ether compound selected from the group consisting of crown ethers, poly(alkylene glycols) and alkylene oxide adducts of bisphenols, which method comprises conducting melt polycondensation and solid-phase polymerization in the presence of $1 \times 10^{-6}$ to $1 \times 10^{-3}$ mol of a compound containing the metal atom A per mol of total acid component constituting said polyester to produce the polyester, and then, kneading therewith $1 \times 10^{-3}$ to 10 parts by weight of the ether linkage-containing compound or a thermoplastic resin containing $1 \times 10^{-3}$ to 10 parts by weight of the ether linkage-containing compound, per 100 parts by weight of said polyester.

11. The method according to claim 10, wherein the metal atom A is antimony.

12. The method according to claim 10, wherein the metal atom A is germanium.

13. A method for producing a poly(ethylene terephthalate) polyester composition, which comprises conducting melt polycondensation and solid-phase polymerization in the presence of $1 \times 10^{-6}$ to $1 \times 10^{-3}$ mol of a compound containing at least one metal atom selected from the group consisting of antimony, titanium and germanium atoms per mol of total acid component constituting said polyester to produce the polyester, and then, kneading therewith $1 \times 10^{-6}$ to $1 \times 10^{-2}$ mol of a phosphorus compound comprising a phosphorus atom having an oxidation number of V or a thermoplastic resin containing $1 \times 10^{-6}$ to $1 \times 10^{-2}$ mol of the phosphorus compound comprising a phosphorous atom having an oxidation number of V, per mol of total acid component, wherein said phosphorus compound comprising a phosphorus atom having an oxidation number of V is at least one phosphoric acid, salt thereof or ester selected from the group consisting of orthophosphoric acid, metaphosphoric acid, polymetaphosphoric acids represented by $(HPO_3)_m$ (wherein m represents an integer of 3 or more) and polyphosphoric acids represented by $H_{n+2}P_nO_{3+1}$ (wherein n represents an integer of 2 or more) and has a phosphoric acid-derived hydroxyl group.

14. A method for producing a poly(ethylene terephthalate) polyester composition, which comprises conducting melt polycondensation and solid-phase polymerization in the presence of $1 \times 10^{-6}$ to $1 \times 10^{-3}$ mol of a compound containing a metal atom selected from the group consisting of antimony, titanium and germanium atoms per mol of total acid component constituting said polyester to produce the polyester, and then, kneading therewith $1 \times 10^{-3}$ to 10 parts by weight of an ether linkage-containing compound or a thermoplastic resin containing $1 \times 10^{-3}$ to 10 parts by weight of the ether linkage-containing compound, per 100 parts by weight of said polyester, wherein said ether linkage-containing compound is at least one ether compound selected from the group consisting of crown ethers, poly(alkylene glycols) and alkylene oxide adducts of bisphenols.

15. The method according to claim 4, wherein said phosphorus compound comprising a phosphorus atom having an oxidation number of V is at least one salt of phosphoric acid selected from the group consisting of orthophosphoric acid salts, metaphosphoric acid salts, salts of polymetaphosphoric acids represented by $(HPO_3)_m$ (wherein m represents an integer of 3 or more) and salts of polyphosphoric acids represented by $H_{n+2}P_nO_{3n+1}$ (wherein n represents an integer of 2 or more) and has a phosphoric acid-derived hydroxyl group.

16. The method according to claim 10, wherein the phosphorus compound comprising a phosphorus atom having an oxidation number of V is at least one salt of phosphoric acid selected from the group consisting of orthophosphoric acid salts, metaphosphoric acid salts, salts of polymetaphosphoric acids represented by $(HPO_3)_m$ (wherein m represents an integer of 3 or more) and salts of polyphosphoric acids represented by $H_{n+2}P_nO_{3n+1}$ (wherein n represents an integer of 2 or more) and has a phosphoric acid-derived hydroxyl group.

17. The method according to claim 7, wherein the ether linkage-containing compound comprises a crown ether.

* * * * *